United States Patent
Idikurt et al.

(10) Patent No.: US 10,763,471 B2
(45) Date of Patent: Sep. 1, 2020

(54) MOTOR VEHICLE BATTERY MODULE

(71) Applicant: Bayerische Motoren Werke Aktiengesellschaft, Munich (DE)

(72) Inventors: Tuncay Idikurt, Munich (DE); Daniel Scherer, Munich (DE); Christoph Klaus, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 44 days.

(21) Appl. No.: 15/492,027

(22) Filed: Apr. 20, 2017

(65) Prior Publication Data

US 2017/0222199 A1 Aug. 3, 2017

Related U.S. Application Data

(63) Continuation of application No. PCT/EP2015/072812, filed on Oct. 2, 2015.

(30) Foreign Application Priority Data

Oct. 23, 2014 (DE) .................. 10 2014 221 493

(51) Int. Cl.
*H01M 2/10* (2006.01)
*H01M 2/18* (2006.01)
(Continued)

(52) U.S. Cl.
CPC .......... *H01M 2/1077* (2013.01); *B60L 50/64* (2019.02); *B60L 50/66* (2019.02); *H01M 2/1094* (2013.01);
(Continued)

(58) Field of Classification Search
None
See application file for complete search history.

(56) References Cited

U.S. PATENT DOCUMENTS

2010/0151309 A1 6/2010 Marukawa et al.
2010/0190049 A1* 7/2010 Kawase ............ H01M 2/1077
429/159
(Continued)

FOREIGN PATENT DOCUMENTS

CN 101765932 A 6/2010
CN 102881855 A 1/2013
(Continued)

OTHER PUBLICATIONS

German-language Search Report issued in counterpart German Application No. 10 2014 221 493.9 dated Sep. 9, 2015 with partial English translation (13 pages).

(Continued)

*Primary Examiner* — Carmen V Lyles-Irving
(74) *Attorney, Agent, or Firm* — Crowell & Moring LLP

(57) ABSTRACT

A motor vehicle battery module, in particular for an electric or hybrid vehicle, includes at least two battery cells which are situated laterally next to one another and form a battery pack, two pressure plates which are situated on opposite sides of the battery pack, and at least one spacer element which has a first bearing surface by which the at least one spacer element bears against a side surface of an adjoining battery cell. The pressure plates are arranged in such a way that the at least two battery cells are arranged between the two pressure plates. The bearing surface is smaller than the side surface, which adjoins the spacer element, of the adjoining battery cell, and therefore part of the side surface is unsupported.

12 Claims, 2 Drawing Sheets

(51) Int. Cl.
  *B60L 50/60*   (2019.01)
  *B60L 50/64*   (2019.01)
(52) U.S. Cl.
  CPC .......... *H01M 2/18* (2013.01); *H01M 2220/20* (2013.01); *Y02T 10/705* (2013.01); *Y02T 10/7005* (2013.01)

(56) References Cited

U.S. PATENT DOCUMENTS

| | | | |
|---|---|---|---|
| 2012/0156537 A1 | 6/2012 | Meintschel et al. | |
| 2012/0202051 A1* | 8/2012 | Iseki | C09J 123/02 428/334 |
| 2013/0017436 A1 | 1/2013 | Kume | |
| 2014/0302378 A1* | 10/2014 | Tsuruta | H01M 2/1061 429/156 |

FOREIGN PATENT DOCUMENTS

| | | |
|---|---|---|
| CN | 104103784 A | 10/2014 |
| DE | 10 2013 020 909 A1 | 6/2015 |
| EP | 2 605 305 A2 | 6/2013 |
| JP | 2007-299544 A | 11/2007 |
| JP | 5108618 B2 | 12/2012 |
| WO | WO 2010/081704 A2 | 7/2010 |

OTHER PUBLICATIONS

International Search Report (PCT/ISA/210) issued in PCT Application No. PCT/EP2015/072812 dated Dec. 11, 2015 with English translation (7 pages).

German-language Written Opinion (PCT/ISA/237) issued in PCT Application No. PCT/EP2015/072812 dated Dec. 11, 2015 (6 pages).

Chinese-language Office Action issued in counterpart Chinese Application No. 201580038723.3 dated Jun. 4, 2018 with English translation (twelve (12) pages).

* cited by examiner

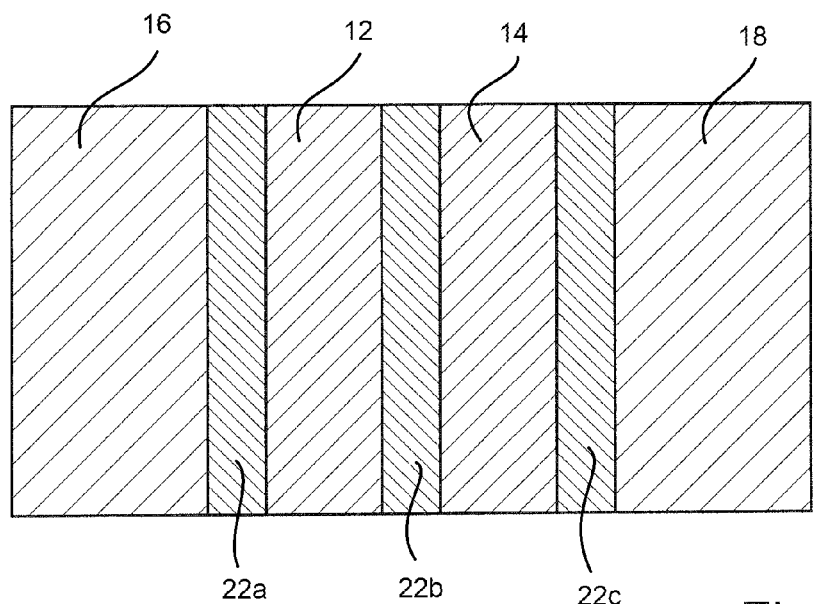
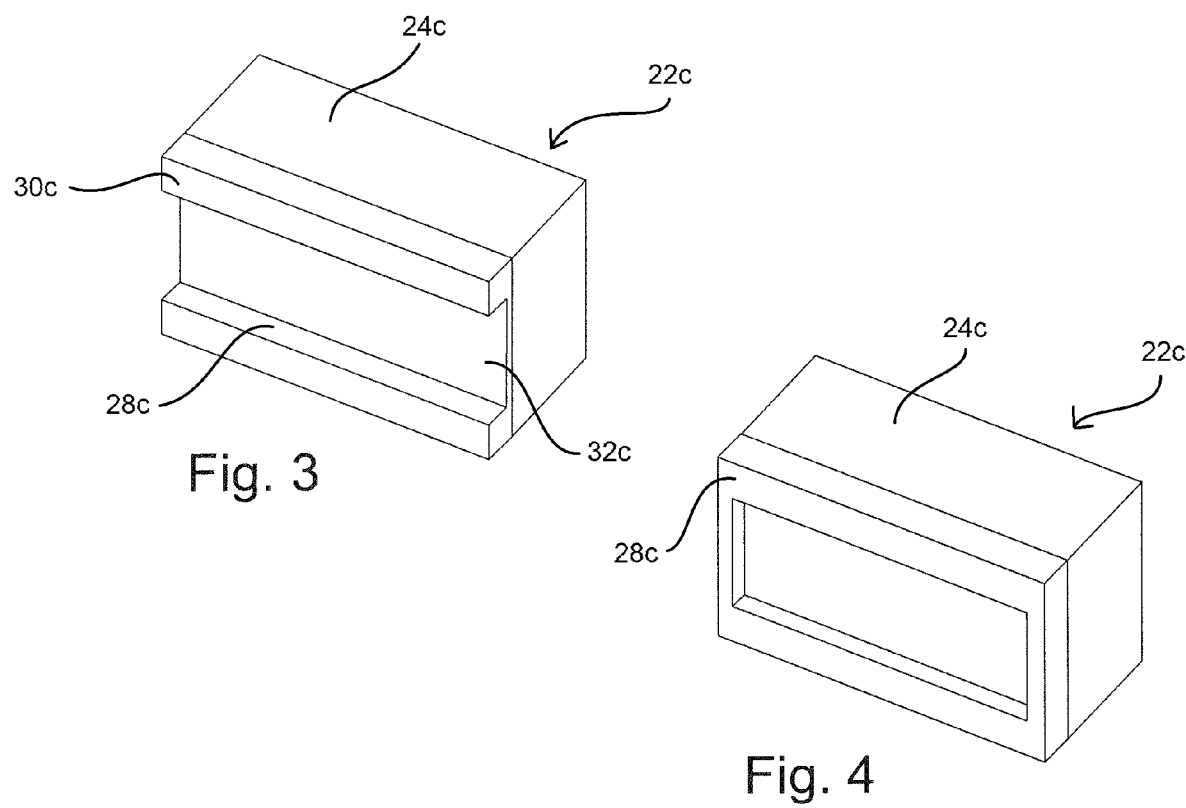

MOTOR VEHICLE BATTERY MODULE

CROSS REFERENCE TO RELATED APPLICATIONS

This application is a continuation of PCT International Application No. PCT/EP2015/072812, filed Oct. 2, 2015, which claims priority under 35 U.S.C. § 119 from German Patent Application No. 10 2014 221 493.9, filed Oct. 23, 2014, the entire disclosures of which are herein expressly incorporated by reference.

BACKGROUND AND SUMMARY OF THE INVENTION

The invention relates to a motor vehicle battery module, in particular for an electric or a hybrid vehicle.

Electric or hybrid vehicles are increasingly coming onto the market as people become more ecologically aware. These motor vehicles have at least one battery module, which provides the electrical drive energy, as the single or an additional drive. A battery module typically consists of a plurality of battery cells, in particular prismatic or prism-shaped battery cells. During production of the battery module, the battery cells are typically adhesively bonded to one another at their surfaces and then compressed by use of pressure plates with distance control and force monitoring, so that the battery cells bear directly against one another and form a compressed battery pack. The pressure plates are then connected to tie rods, as a result of which the compressed battery pack is clamped by a circumferential frame and in this way held in the defined form.

It has been found to be disadvantageous that, in the case of the battery modules known from the prior art, it is not possible to compensate for forces which occur during operation on account of cell breathing. Furthermore, production-related component tolerances cannot be compensated for in the case of the battery modules known from the prior art.

The object of the invention is to provide a motor vehicle battery module which provides force and/or distance compensation and nevertheless allows the battery cells to be pressed.

According to the invention, the object is achieved by a motor vehicle battery module, in particular for an electric or a hybrid vehicle, having at least two battery cells, which are situated laterally next to one another and form a battery pack, and also having two pressure plates which are situated on opposite sides of the battery pack and are arranged in such a way that the at least two battery cells are arranged between the two pressure plates, as well as having at least one spacer element which has a first contact face by which the at least one spacer element can bear against a side face of an adjoining battery cell. The contact face is smaller than the side face, which adjoins the spacer element, of the adjoining battery cell, so that a portion of the side face is unsupported.

An aspect of the invention is to avoid full-surface contact and pressing of the battery cells over the entire side face in order to allow, in general, distance or force compensation. Since the spacer element does not bear against the full surface of the side face of the adjoining battery cell, only a portion of the side face is supported by means of the spacer element. By way of this portion, the force which is required for pressing is transmitted to the individual battery cells by the pressure plates, so that the compressed battery pack can be formed. The unsupported portion of the side face can, in contrast, serve to balance and compensate for forces and tolerances. This creates a spacer element which mechanically spaces apart the adjoining battery cell and, at the same time, provides non-mechanical distance and/or force compensation for the adjoining battery cell.

One aspect of the invention provides that the spacer element extends over the entire adjoining side face of the adjoining battery cell. This ensures that the spacer element is associated with the entire side face of the battery cell, as a result of which it is possible to completely space apart the adjoining battery cell.

According to a further aspect of the invention, the first contact face is formed on at least one projection on the at least one spacer element. This makes it possible to space apart the adjoining battery cell in a defined manner since, amongst other things, the contact face is defined by means of the dimensions of the projection. The contact face can also be formed by two or more projections in order to achieve more homogeneous introduction of force when pressing the battery cells.

In particular, the spacer element has a main body, wherein projections are present on opposite edges of the main body, and wherein the edges are associated with opposite end sides of the adjoining battery cell. This ensures that the spacer element makes contact with the adjoining battery cell at its end-side edges, so that force transmission takes place at the edges of the adjoining battery cell during compression of the battery cells. The adjoining battery cell can undergo the greatest possible degree of force and/or distance compensation since the projections and therefore the contact face are formed on the edge.

A further aspect of the invention provides that a hollow space is formed between the spacer element and the adjoining battery cell. The hollow space is present, for example, between the two edge-side projections, the adjoining battery cell and the main body of the spacer element. On account of the hollow space, it is possible for the adjoining battery cell to expand into the hollow space during operation of the motor vehicle battery module, as a result of which compensation of the increasing forces on account of the aging of the battery cells is possible. The hollow space into which the adjoining battery cell extends constitutes non-mechanical compensation which is not dependent on a spring characteristic curve.

Furthermore, the first contact face can be of adhesive design, in particular can be provided with an adhesive coating. This ensures that the spacer element is fixedly connected to the adjoining battery cell, so that the spacer element cannot slip relative to the adjoining battery cell.

A further aspect of the invention provides that the at least one spacer element has a second contact face which is provided on that side of the spacer element which is situated opposite the first contact face and which second contact face bears against a second, adjacent battery cell, so that the at least one spacer element spaces apart two battery cells from one another. The second contact face can be designed, in particular, like the first contact face, so that a hollow space into which the second adjacent battery cell can extend likewise forms between the second, adjacent battery cell. Therefore, two battery cells can undergo force and/or distance compensation by means of one spacer element.

According to a further embodiment of the invention, the at least one spacer element has a second contact face which is provided on that side of the spacer element which is situated opposite the first contact face and which second contact face bears against a pressure plate, so that the at least one spacer element spaces apart an end-side battery cell of the battery pack from a pressure plate. Force and/or distance compensation of the edge-side battery cell is possible in this way. In general, this results in cell breathing or expansion of the battery cells being possible during operation since the edge-side battery cell does not bear against the full surface of the pressure plate. Nevertheless, the required pressing is achieved since the pressure plate acts on the end-side battery cell, and therefore the entire battery pack, by means of the spacer element and, in particular, the projections.

In particular, the spacer element has a U- or double-T-shaped cross section. Depending on the use of the spacer element, the spacer element can be designed as a "double-T"-shaped spacer element, as a result of which two adjacent battery cells undergo distance compensation. Provided that the spacer element is arranged on a pressure plate, the spacer element can also have a U-shaped cross section, wherein the spacer element bears against the end-side or outer battery cell of the battery pack by way of the two free limbs which represent the projections.

According to one aspect of the invention, the at least one spacer element is formed from an electrically insulating material. Therefore, the spacer element provides electrical insulation of the battery cells at the same time, as a result of which the spacer element has a double function, specifically force and/or distance compensation and electrical insulation. Additional insulation between the battery cells can therefore be dispensed with, as a result of which the number of components in the motor vehicle battery module is reduced.

A further embodiment of the invention provides that at least one spacer element is provided between a plurality of, in particular all of, the adjacent battery cells and/or between the outer battery cells and the adjacent pressure plates. This forms force and/or distance compensation of all of the battery cells, as a result of which it is ensured that the increasing force can be adequately compensated for over the run time of the battery module on account of the expansion of the battery cells.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a side view of a motor vehicle battery module according to the invention in accordance with a second embodiment.

FIG. 3 is a perspective view of a battery cell with a spacer element arranged on it in accordance with a third embodiment.

FIG. 4 is a perspective view of a battery cell with a spacer element arranged on it in accordance with a further embodiment.

DETAILED DESCRIPTION OF THE DRAWINGS

Figure 1:
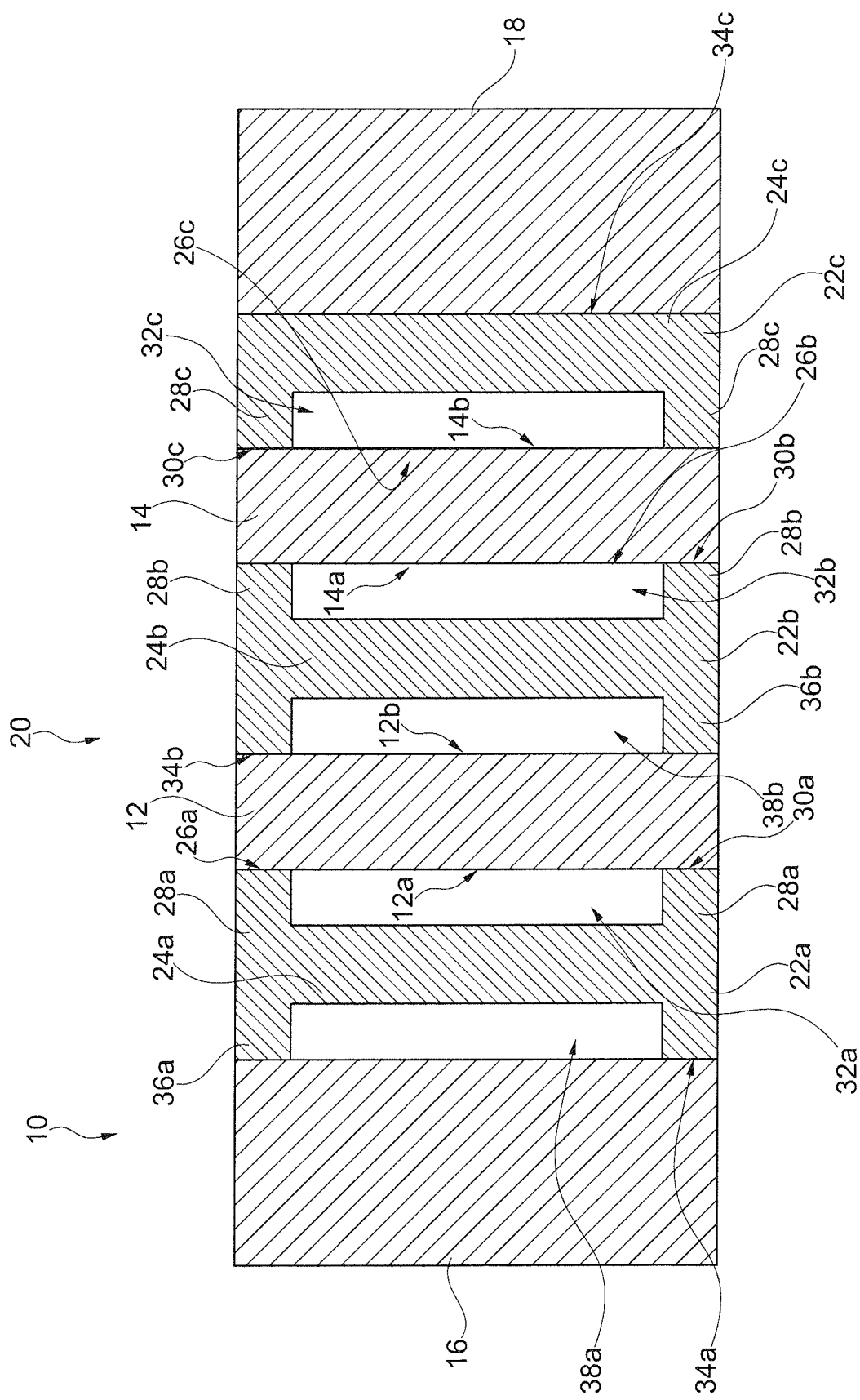
FIG. 1 is a schematic cross sectional illustration of a motor vehicle battery module according to the invention in accordance with a first embodiment.

FIG. 1 shows a motor vehicle battery module 10 which has a first battery cell 12 and also a second battery cell 14, which battery cells each have a first side face 12a, 14a and a second side face 12b, 14b. The battery cells 12, 14 are each held in a pressed state by way of a first pressure plate 16 and a second pressure plate 18 in order to form a battery pack 20.

The motor vehicle battery module 10 further has spacer elements 22a, 22b, 22c which are likewise associated with the battery pack 20 since they are arranged between the two pressure plates 16, 18.

A first spacer element 22a is arranged between the first pressure plate 16 and the edge-side first battery cell 12 of the battery pack 20, in particular the first side face 12a of the first battery cell. A second spacer element 22b is provided between the two battery cells 12, 14, wherein the second spacer element bears against the second side face 12b of the first battery cell 12 and the first side face 14a of the second battery cell 14. A third spacer element 22c is arranged between the second pressure plate 18 and the end-side second battery cell 14 of the battery pack 20, in particular the second side face 14b of the second battery cell.

In the embodiment shown, the two spacer elements 20a, 20b are formed with a double-T-shaped cross section, whereas the third spacer element 22c is formed with a U-shaped cross section.

The spacer elements 22a, 22b, 22c each have a central, plate-like main body 24a, 24b, 24c from which in each case two first projections 28a, 28b, 28c project on a first side 26a 26b, 26c of the respective spacer element 22, which first side is directed toward the adjoining battery cell 12, 14.

The first projections 28a, 28b, 28c are arranged on the edge-side of the respective main body 24, so that they make contact with the adjoining battery cells 12, 14 at edges which are associated with opposite end sides of the adjoining battery cells 12, 14. Accordingly, the spacer elements 22 extend over the entire height or side face 12a, 12b, 14a, 14b of the battery cells 12, 14.

The first projections 28a, 28b, 28c each form a first contact face 30a, 30b, 30c by means of which the spacer element 22a, 22b, 22c bears directly against the respectively adjoining battery cell 12, 14. The projections 28a, 28b, 28c do not extend over the entire, respectively associated side face 12a, 14a, 14b of the battery cells 12, 14, for which reason the corresponding contact face 30a, 30b, 30c is smaller than the respectively adjoining side face 12a, 14a, 14b. Accordingly, the side faces 12a, 14a, 14b are only partially supported by the spacer elements 22.

A first hollow space 32a, 32b, 32c is in each case formed between the main body 24 and the two first projections 26a, 26b, 26c of the respective spacer element 22a, 22b, 22c and also the battery cell 12, 14 which adjoins said projections. During operation of the motor vehicle battery module 10, the respectively adjoining battery cell 12, 14 can extend into the hollow spaces 32a, 32b, 32c when the battery cell 12, 14 in question expands due to an increased service life. This provides force and/or distance compensation during operation of the motor vehicle battery module 10. The forces which act on the battery cells 12, 14 can be reduced in this way, in particular the forces which occur at the end of the service life of the motor vehicle battery module 10.

Furthermore, the spacer elements 22a, 22b, 22c each have a second contact face 34a, 34b, 34c, wherein this differs in the various spacer elements 22a, 22b, 22c.

The first and the second spacer element 22a, 22b are, as already mentioned, physically identical since they are both formed with a double-T-shaped cross section. Therefore, the two spacer elements 22a, 22b have two second projections 36a, 36b which are integrally formed on sides of the main body 24a, 24b which are opposite the first projections 28a, 28b and, respectively, the first sides 26a, 26b.

The second projections 36a, 36b each define the second contact faces 34a, 34b of these two spacer elements 22a, 22b.

A second hollow space 38a, 38b is likewise in each case formed between the first and the second spacer element 22a, 22b, in particular the respective second projections 36a, 36b, and the first pressure plate 16 or the first battery cell 12.

The two spacer elements 22a, 22b are generally designed with mirror-image symmetry, so that that side which is opposite the first side 26a, 26b is accordingly of identical design.

For the second spacer element 22b, it is the case, for example, that the second battery cell 14 can expand into the first hollow space 32b and the first battery cell 12 can expand into the second hollow space 38b during operation of the motor vehicle battery module 10, as a result of which force and/or distance compensation of the battery cells 12, 14 is provided.

In contrast, the third spacer element 22c is of U-shaped design, so that the second contact face 34c of said third spacer element is formed directly on the main body 24c, the spacer element 22c bearing against the full surface of the second pressure plate 18 by means of said second contact face. Since the pressure plate 18 does not expand during operation of the motor vehicle battery module 10, a hollow space between the pressure plate 18 and the adjoining spacer element 22c is not required either.

The two limbs of the U-shaped third spacer element 22c constitute the first projections 28c by means of which the third spacer element 22c bears against the adjoining battery cell 14, in particular the second side face 14b of the battery cell.

The first contact face 30a, 30b, 30c of the spacer elements 22a, 22b, 22c can in each case in particular be of adhesive design, so that it is ensured that the spacer elements 22a, 22b, 22c maintain their defined positions. To this end, the first contact face 30a, 30b, 30c can be provided with an adhesive coating.

The second contact face 34a, 34b of the spacer elements 22a, 22b can likewise in each case be of adhesive design in order to guarantee that the spacer elements 22a, 22b are held in an exact position on both sides.

In particular, the spacer elements 22a, 22b, 22c are formed from an electrically insulating material, so that the individual battery cells 12, 14 are electrically insulated from one another and no additional component is required. In this case, the spacer elements 22a, 22b, 22c can be produced from a plastic or a foamed material, so that they are cost-effective and lightweight. The first projections 28a, 28b, 28c and optionally the second projections 36a, 36b are preferably integrally formed with the main body 24a, 24b, 24c, so that the spacer elements 22a, 22b, 22c are generally in one piece.

As is clear from the figure, the battery pack 20 can be generated during production of the motor vehicle battery module 10 since the force which is exerted onto the battery cells 12, 14 by the pressure plates 16, 18 can be transmitted to the battery cells 12, 14 by means of the spacer elements 22a, 22b, 22c, in particular the projections 28a, 28b, 28c, 36a, 36b of the spacer elements. Accordingly, it is possible to compress or press the battery cells 12, 14.

However, since the spacer elements 22a, 22b, 22c do not bear against the full surface of the adjoining or adjacent battery cells 12, 14, force and/or distance compensation can take place during manufacture and operation since the battery cells 12, 14 can expand, for example, into the created hollow spaces 32a, 32b, 32c, 38b. Furthermore, production-related component tolerances can be more effectively compensated in this way.

In general, a different number of spacer elements 22a, 22b, 22c can be provided, it being possible for the spacer elements to each be formed with a double-T-shaped cross section. Furthermore, only two spacer elements 22 can also be provided, the spacer elements both being formed with a "U"-shaped cross section and each being arranged between a pressure plate 16, 18 and an end-side battery cell of the battery pack 20.

FIG. 2 shows a side view of a motor vehicle battery module 10 in accordance with a second embodiment. Identical elements or elements with the same effect are provided with the same reference symbols.

In this embodiment, a respective spacer element 22a, 22b, 22c is again arranged between two battery cells 12, 14 and also between one of the battery cells 12, 14 and an associated pressure plate 16, 18.

As is clear from the side view, the spacer elements 22a to 22c, at least by way of an outer edge, bear against the surface of the battery cells 12, 14 and/or the pressure plates 16, 18.

FIG. 3 shows, by way of example, a spacer element which can be used in a motor vehicle battery module 10 in accordance with the second embodiment. The spacer element 22c shown is that spacer element which bears against the pressure plate 18.

The spacer element 22c likewise has a plate-like main body 24c from which two projections 28c project, the projections being of elongate design and extending over the entire relatively long edge of the main body 24cIn this embodiment, the projections 28c can also be understood to be edge-side thickened portions of the relatively long edges of the main body 24c.

The two projections 28c form a first contact face 30c by which the spacer element 22c bears against an adjoining or adjacent battery cell (not illustrated here).

Therefore, a hollow space 32c is formed between the two projections 28c of the spacer element 22c and the battery cell (not illustrated here). It is possible for the battery cell to expand into the hollow space during operation.

The spacer element 22c has, on that side which is opposite the first contact face 30c, a second contact face 34c which can be formed on the surface of the plate-like main body 24c. The spacer element can bear against the surface of the pressure plate 18 by way of the second contact face 34c, as is illustrated here.

As an alternative, the second contact face 34c can likewise be provided on second projections, so that the spacer element 22c is designed with mirror-image symmetry. This is advantageous particularly when the spacer element 22c is arranged between two battery cells, so that a hollow space is associated with each battery cell.

FIG. 4 shows a further embodiment of the spacer element 22c, in which the first contact face 30c is provided on a projection 28c, which runs around in the manner of a frame, on the plate-like main body 24c.

In addition, a hollow space 32c is again formed in this way when the spacer element 22c bears against an adjacent battery cell, not illustrated here, by means of the first contact face 30c, so that said battery cell can expand into the hollow space 32c.

The spacer element 22c shown in FIG. 4 can likewise have mirror-image symmetry, so that a second contact face 34c is likewise provided on a projection which runs around in the manner of a frame. As an alternative, the second contact face 34c can be formed on the full surface of the plate-like main body 24c.

The spacer element 22c has been shown merely by way of example in FIGS. 3 and 4. The other spacer elements 22a, 22b can likewise be formed in this way.

The motor vehicle battery module 10 according to the invention therefore exhibits force and/or distance compensation which firstly compensates for manufacturing tolerances during production of the motor vehicle battery module and secondly provides distance and/or force compensation over the run time of the motor vehicle battery module 10 since the adjoining battery cells 12, 14 can extend into the hollow spaces 32a, 32b, 32c, 38b which are formed.

Furthermore, a complex process for adhesively bonding the individual battery cells 12, 14 to one another can be dispensed with, so that there is no adhesively bonded cell pack, as is typically the case in the prior art. Production of the motor vehicle battery module 10 is accordingly simpler and quicker as a result.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle battery module for an electric or a hybrid vehicle, comprising:
    at least two battery cells, which are situated next to one another in a lateral direction of the motor vehicle battery module and form a battery pack;
    two pressure plates, which are situated on opposite sides of the battery pack and are arranged such that the at least two battery cells are arranged between the two pressure plates;
    at least one spacer element which has two first projections respectively disposed on opposite outer edges of a main body of the at least one spacer element, wherein a respective first contact face is formed on each of the two first projections, by which the at least one spacer element abuts against a side face of an adjoining battery cell, where the respective first contact faces are perpendicular to the lateral direction of the motor vehicle battery module, wherein
    the two first projections are smaller than the side face, which adjoins the at least one spacer element, of the adjoining battery cell, so that a portion of the side face is unsupported,
    the two first projections respectively disposed on the outer edges of the main body of the at least one spacer element form a hollow space therebetween and between the spacer element and the adjoining battery cell such that the adjoining battery cell can extend into the hollow space during operation of the motor vehicle battery module.

2. The motor vehicle battery module according to claim 1, wherein the at least one spacer element extends over an entire adjoining side face of the adjoining battery cell.

3. The motor vehicle battery module according to claim 1, wherein the respective first contact faces are provided with an adhesive coating.

4. The motor vehicle battery module according to claim 1, wherein
    the at least one spacer element has a second contact face which is provided on that side of the at least one spacer element which is situated opposite the respective first contact faces, and
    the second contact face bears against a second, adjacent battery cell, so that the at least one spacer element spaces apart two battery cells from one another.

5. The motor vehicle battery module according to claim 1, wherein
    the at least one spacer element has a second contact face which is provided on that side of the at least one spacer element which is situated opposite the respective first contact faces, and
    the second contact face bears against a pressure plate, so that the at least one spacer element spaces apart an end-side battery cell of the battery pack from the pressure plate.

6. The motor vehicle battery module according to claim 1, wherein the at least one spacer element has a U-shaped cross section.

7. The motor vehicle battery module according to claim 1, wherein the at least one spacer element has a double-T-shaped cross section.

8. The motor vehicle battery module according to claim 1, wherein the at least one spacer element is formed from an electrically insulating material.

9. The motor vehicle battery module according to claim 6, wherein the at least one spacer element is formed from an electrically insulating material.

10. The motor vehicle battery module according to claim 7, wherein the at least one spacer element is formed from an electrically insulating material.

11. The motor vehicle battery module according to claim 1, wherein at least one spacer element is provided between a plurality of adjacent battery cells and/or between outer battery cells and adjacent pressure plates.

12. The motor vehicle battery module according to claim 1, wherein at least one spacer element is provided between all of the adjacent battery cells and/or between outer battery cells and adjacent pressure plates.

* * * * *